United States Patent [19]

Tiilikainen

[11] Patent Number: 5,684,873
[45] Date of Patent: Nov. 4, 1997

[54] QUICK DIALING IN PERSONAL MOBILE PHONE

[75] Inventor: Ilkka Tiilikainen, Tampere, Finland

[73] Assignee: Nokia Mobile Phones Limited, Salo, Finland

[21] Appl. No.: 582,136

[22] Filed: Jan. 2, 1996

[30] Foreign Application Priority Data

Jan. 9, 1995 [FI] Finland ................................. 950096

[51] Int. Cl.⁶ .................................................. H04M 1/274
[52] U.S. Cl. ........................................... 379/354; 379/355
[58] Field of Search ............................. 379/354, 355, 379/356, 357, 96, 110; 345/179, 180, 181, 182, 183

[56] References Cited

U.S. PATENT DOCUMENTS

| | | | |
|---|---|---|---|
| 4,653,086 | 3/1987 | Laube | 379/355 X |
| 5,267,308 | 11/1993 | Jokinen et al. | 379/354 |
| 5,283,818 | 2/1994 | Klausner et al. | 379/96 X |
| 5,390,236 | 2/1995 | Klausner et al. | 379/354 X |
| 5,422,656 | 6/1995 | Allard et al. | 345/173 |
| 5,434,777 | 7/1995 | Luciw | 395/759 |
| 5,522,089 | 5/1996 | Kikinis et al. | 379/96 X |

FOREIGN PATENT DOCUMENTS

| | | |
|---|---|---|
| 0570116 | 11/1993 | European Pat. Off. . |
| 0664504 | 7/1995 | European Pat. Off. . |
| 62-188538 | 8/1987 | Japan ............................. 379/354 |
| 63-27144 | 2/1988 | Japan . |
| 63-114348 | 5/1988 | Japan . |

OTHER PUBLICATIONS

"Sharp Wizard", Advertisement, Popular Science, Jan. 1995, p. 14.

"Pen–Based Automated Interpersonal Communications System", IBM Technical Disclosure Bulletin, vol. 38, No. 03, Mar. 1995, pp. 299–300.

*Primary Examiner*—Krista M. Zele
*Assistant Examiner*—Devendra T. Kumar
*Attorney, Agent, or Firm*—Perman & Green, LLP

[57] ABSTRACT

Telephone numbers along with alphanumerical identifications representing the same are stored in the memory of a mobile phone. The number is selected with quick dialing so that the user first scrolls the identification corresponding to the required number on the display (11). In the method of this invention the display is a touch-sensitive display (21). For each identification several alternative telephone numbers are stored in the quick dialing memory, for instance to work (W), home (H), or mobile phone (M). The desired number is selected and a call initiated by writing a gesture (23) corresponding to the required number on the display (21) or in a specified field of the display (24).

11 Claims, 1 Drawing Sheet

QUICK DIALING IN PERSONAL MOBILE PHONE

BACKGROUND OF THE INVENTION

1. Field of the Invention

This invention relates to a quick-dialing method in which a telephone number is dialed in a simple and effective manner in a mobile phone. In this connection the term 'mobile phone' is understood in the widest meaning, i.e. it can refer to a mobile phone, such as a NMT or GSM phone, or some other portable Personal Communicator, for instance a pocket-size phone, in which quick dialing is used. Likewise, the term 'telephone number' must be understood in a wider sense, also referring to a subscriber number of terminal equipment in public switched telephone network, an extension number at a private branch exchange, the number of another mobile phone or some other corresponding number. Later in this document the term 'gesture' refers to a drawn symbol, a character, a shape, etc.

2. Background Art

To begin with we look at existing mobile phones as an example that may have a user interface corresponding to the one shown in FIG. 1. Mobile phone 10 is equipped with an alphanumerical display 11, feature keys 13, and digit/character keys 14 and scrolling key 12. A device of this type is equipped with a microprocessor and memory to which various parameters related to the phone's use can be stored with keys 12, 13, and 14. From the user's point of view it is practical that also telephone numbers can be stored in the memory. Depending on the mobile phone, the number of memory locations may amount to 100 or even more and in addition to the telephone number also a name or other alphanumeric identification relating to the number can he stored in those locations. When the user wants to make a call to a number previously stored, he will access the number along with the related identification on the display by using the keys 12, 13, and 14 in a suitable sequence. After checking the number/identification user can initiate the call by pressing a pre-defined feature key 13. The required number can be brought to the display by using the address of the memory location or even more easily by first selecting e.g. the first letter of a name and then scrolling the names that start with this letter on the display. Naturally, the contents of the memory can also be scrolled according to the sequential order of the memory location order with the scrolling key 12. This feature, the so-called quick dialing method is a factor enhancing user-friendliness and also means improved safety, especially if the phone is used while driving a car.

The operating pattern of quick dialing described above is quite logical and usable in most cases. However, if the same person has several alternative telephone numbers which the mobile phone user wants to store in the memory of the phone, the user must consequently make sure that the correct number option is selected beside checking the name. In this case it may concern a person's telephone number to work, home or a mobile phone, etc. Scrolling will be a longer process and become slower, and at the same time, the risk of dialing a wrong number increases.

SUMMARY OF THE INVENTION

The object of this invention is to find a solution capable of correcting the above mentioned shortcomings and disadvantages of prior dialing methods. This is implemented according to a method wherein telephone numbers and corresponding identifications are stored in the memory of a telephone prior to making a call and the number to be called is selected with a quick dialing method so that the user first searches an identification corresponding to the desired number on the display by using keys such that at least one of the identifications has at least two alternative telephone numbers associated thereto, and the desired telephone number related to the at least one identification shown on the display is selected by writing a pre-selected gesture on the display. This means that the same person, i.e. the same identification, has several telephone numbers stored in the memory of the mobile phone of which the required number is selected by writing the gesture or symbol corresponding to the required number to the touch-sensitive display.

In the communicator according to the invention the touch-sensitive display can be implemented in a manner known per se, e.g. as an inductive or capacitive display.

This invention can be well applied in mobile phones, for instance in NMT, GSM, JDC, PCN, DAMPS or other equivalent mobile phones.

Other preferred embodiments of this invention have been presented in dependent patent claims. In the following, the invention is described in further detail with reference to the enclosed drawings where FIG. 1 illustrates the essential parts, with respect to the invention, of a mobile phone, previously known per se;

Figure 1:
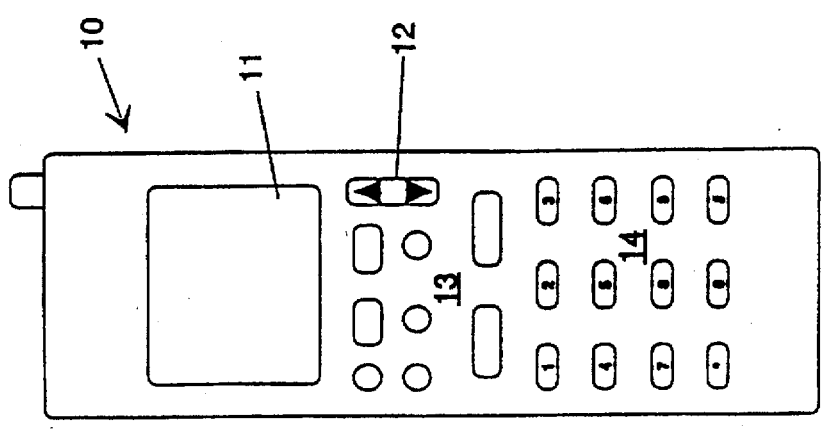

A more detailed description of the invention is given in the following with the help of examples, and for simplicity the starting point is considered to be the NMT phone already presented in FIG. 1 whereby a simplified diagram of the parts of the Nokia 101 phone (Nokia Mobile Phones, Finland) that are essential to this description is shown in FIG. 1. The user controls the operation of the device with the groups of buttons or keys 12, 13, and 14. The device provides information to the user on the display 11. In particular the user can select the desired numbers on the display 11 for quick dialing with a pre-defined feature key 13. In this case it is required that the numbers have been stored in a manner previously known per se, as mentioned before. A name or some alphanumerical identification is preferably combined with the phone number, because it is easier for the user to remember a name, for instance.

Figure 2:
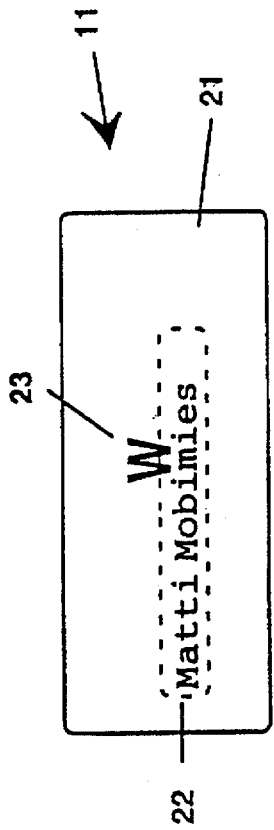
FIG. 2 shows the much-sensitive display of the phone onto which a gesture has been drawn in accordance with the invention.
Figure 3:
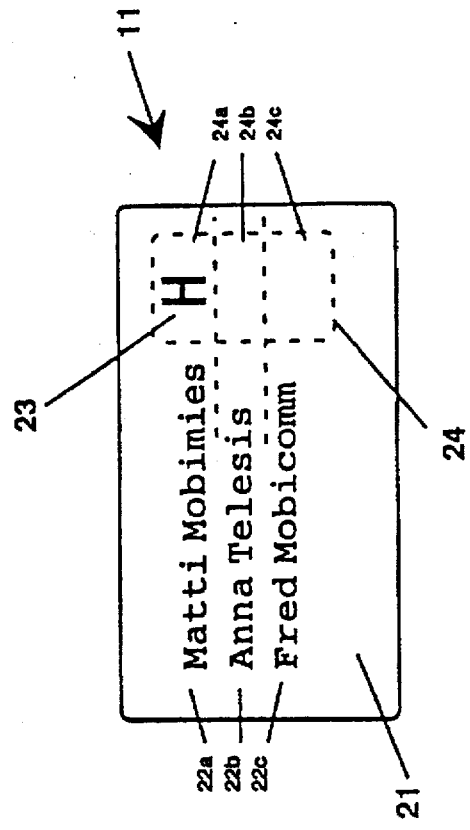
FIG. 3 illustrates the touch-sensitive display in a similar manner to FIG. 2, but in this embodiment the display shows several identifications simultaneously.

In accordance with the invention several numbers related to the same identification are stored to the phone's memory which in the examples given in FIG. 2 and 3 correspond to groups 'work', 'home', and 'mobile phone'. Naturally, the user does not have to adhere to this division, but can save for instance telephone numbers to summer cottages under a certain group, if desired, so that e.g. the some identifications belonging to the group 'mobile' would correspond to a mobile phone number whereas some identifications in the same group would refer to a telephone number of a summer cottage.

When the desired name or identification has been scrolled with the scrolling key 12 to field 22 of the display 21, the user can select the desired number by writing a gesture on the display. For writing the gesture e.g. a pen can be used. Upon writing the gesture the phone immediately makes a call to the selected number. The prespecified gestures can be chosen e.g. so that they correspond to specified conventional locations, such as H (home) for home number, W (work) for the phone number at work, and M (mobile) for the mobile phone number. Naturally also other suitable symbols, characters or character combinations can be used. In FIG. 2 the user has selected the work number W (23) for identification 22. In FIG. 3 the user has written the gesture corresponding to home number H (23).

According to the size of the field 21 on the display 11 at the disposal also several identifications (22a, 22b, 22c) can be brought to the display with scrolling key 12, as shown in FIG. 3. There are several ways of selecting the required number. Firstly, the desired identification can be scrolled with scrolling key 12 to the required line, for instance to the uppermost field 22a, whereby the selection is carried out by writing the desired gesture somewhere on the display, as shown in FIG. 2. In this case the whole area of display 21 is available for use.

Alternatively, the display can be divided into identification lines whereby selection is made by writing the gesture on the desired line 22a–22c. With a pen or other rather sharp pointed object it is naturally possible to unambiguously make a selection, even if the line concerned is narrow.

One possibility is seen in that the gesture for quick dialing is written in a designated area. The area could for instance be located on the right side of the display 21. This is illustrated in FIG. 3, where dotted lines indicate the field in which the gesture is intended to be written in order to enable the device to interpret it correctly. If the display in question shows several identification lines at the same time, as shown in FIG. 3, the field 24 must be divided also horizontally into rows as the user can make a quick dialing to any of the numbers represented by the identification or name on the display.

With a display arranged according to the invention the quick dialing function can be made clearer. As quick dialing is made by writing gestures on the display, no separate corresponding push buttons or keys sufficiently large in size, are needed, which naturally saves the area of the phone's front panel. The method according to the invention also provides the user with a clear quick dialing method since several different phone numbers can be stored under the same identification or name. When the distinction between numbers referred to with different gestures is made on the basis of the same principle for all identifications, the quick dialing will become faster. Naturally, memory space required for storing the quick dialing numbers can be saved, as several phone numbers can be stored under the same identification and there is no need to reserve memory space for storing a number-specific identification, too. As the number of telephone numbers in the memory increases, also the savings can be considerable.

When required, the display 11 can be made large enough to accommodate both the display and all the keys 12–14 shown in the figure or some of them which would in this case correspond to the area indicated with reference number 15 in FIG. 1. This arrangement does not as such have effect on the use of identifications and gestures.

The written gestures can also be used for editing quick dialing numbers. Thus it is conceivable that the user writes both the identification and the related phone number via the touch-sensitive display. Alternatively the user can use the keys 14. With the touch-sensitive display the numbers can be entered in whatever location in the display 21 by writing a character/digit at a time or group of characters at a time.

It is also possible to use the gestures for instance to remove an identification and/or telephone numbers already stored in the memory. If e.g. the gesture X is written on a name shown on the display, the device could be programmed to identify this gesture as a delete command and would remove both the identification and related numbers from the memory. A person skilled in the art will understand that this idea can be further developed in different ways.

Naturally a person skilled in the art will on the basis of the above description find many applications and modifications to the method and communicator according to this invention.

As a consequence, the arrangement of the display and keys shown in FIG. 1 is not restrictive, but the display could as well be placed in another location on the front panel of the device. Further, the size of the display does not limit the use of the invention, since the same idea can be applied to display units where 1 to n fields 22 are shown whereby n is selected to correspond to the size and resolution of the display.

The gestures used for quick dialing can naturally be chosen at the user's will as long as they are easy to remember and write on the display. Characters, simple symbols such as a circle, square, triangle, etc. are possible alternatives. Unambiguous, easily discernible gestures are anyhow preferred. Although this description mentions that three telephone numbers are stored under an identification, it is naturally possible that only two or more than three numbers are stored. However, practice may prove that this should not be carried to an excess. We prefer that e.g. at the most 5 telephone numbers are stored under the same identification. In this case, at least five corresponding gestures would be needed, too.

The principle of this invention can be applied to mobile phones and other corresponding devices in which a simplified quick dialing method is required.

I claim:

1. A method for quickly initiating a telephone call from a telephone (10), in which method telephone numbers and corresponding identifications are stored in a memory of said telephone (10) prior to making a call and the number to be called is selected with a quick dialing method so that the user first searches an identification corresponding to the desired number on a display (11) by using keys (11, 12, 13), characterized in that at least one of said identifications has at least two alternative telephone numbers associated thereto, and the desired telephone number related to said at least one identification shown on the display is selected by writing a pre-selected gesture (23) on the display (21).

2. A method according to claim 1, characterized in that at least two identifications (22a, 22b, 22c) are shown on the display (11) in different sub-areas at the same time whereby a required number is selected by writing a gesture on the sub-area corresponding to the required identification.

3. A method according to claim 1, characterized in that at least two identifications are shown on the display at the same time whereby the required number is selected by first scrolling the required identification to a pre-defined line and by subsequently writing a pre-defined gesture corresponding to the required number on the display (21).

4. A method according to claim 1, characterized in that the identification is a person's name or an alphanumerical character string standing for it.

5. A method according to claim 1, characterized in that the gesture is written on a specified field (24) of the display (21).

6. A method according to claim 5, characterized in that the gesture is written on a specified field (24) of the display (21) on a line (24a, 24b, 24c) corresponding to a desired identification (22a–22c).

7. A method according to claim 1, characterized in that a pen is used for writing on the display.

8. A method according to claim 1, characterized in that an identification shown on the display is deleted from a quick dialing memory by writing a gesture standing for a delete command on the display (21) or on a specified field (24).

9. A personal communicator (10) comprising a display (11) for displaying information, a plurality of keys (12, 13, 14) for entering information and memory means for storing telephone numbers and corresponding identifications, at least one of said keys being arranged to produce representatives of said identifications to said display when actuated, characterized in that said display (11) is a touch-sensitive display and that said personal communicator (10) further comprises character recognition means for recognizing and interpreting graphical commands entered by writing on said touch-sensitive display, said character recognition means being arranged to produce a call-initiating signal when a predetermined graphical command is entered while at least one of said identifications is displayed on said display (11).

10. A personal communicator according to claim 9, characterized in that said touch-sensitive display (11) comprises touch-sensitive fields, and said character recognition means is arranged to detect in which of said fields a graphical command was entered.

11. A personal communicator according to claim 9, characterized in that at least some of said keys (12, 13, 14) are included in the vicinity of said touch-sensitive display (21).

* * * * *